United States Patent [19]
Knaebel et al.

[11] Patent Number: 5,226,933
[45] Date of Patent: Jul. 13, 1993

[54] PRESSURE SWING ADSORPTION SYSTEM TO PURIFY OXYGEN

[75] Inventors: Kent S. Knaebel, Plain City; Alexander Kandybin, Columbus, both of Ohio

[73] Assignee: Ohio State University, Columbus, Ohio

[21] Appl. No.: 859,227

[22] Filed: Mar. 31, 1992

[51] Int. Cl.⁵ .............................................. B01D 53/04
[52] U.S. Cl. ........................................... 55/26; 55/33; 55/58; 55/62; 55/66; 55/68; 55/75
[58] Field of Search .................... 55/25, 26, 58, 62, 66, 55/68, 75, 31, 33

[56] References Cited

U.S. PATENT DOCUMENTS

| | | | |
|---|---|---|---|
| 3,086,339 | 4/1963 | Skarstrom, et al. | 55/26 |
| 3,237,377 | 3/1966 | Skarstrom | 55/25 |
| 3,252,268 | 5/1966 | Stark | 55/25 |
| 3,430,418 | 3/1969 | Wagner | 55/25 |
| 3,564,816 | 2/1971 | Batta | 55/26 |
| 3,619,984 | 11/1971 | Domine et al. | 55/25 |
| 3,636,679 | 1/1972 | Batta | 55/26 |
| 3,638,398 | 2/1972 | Domine et al. | 55/25 |
| 3,717,974 | 2/1973 | Batta | 55/58 |
| 3,738,087 | 6/1973 | McCombs | 55/58 |
| 3,788,036 | 1/1974 | Lee et al. | 55/25 |
| 3,797,201 | 3/1974 | Tamura | 55/62 |
| 3,922,149 | 11/1975 | Ruder et al. | 55/21 |
| 3,923,477 | 12/1975 | Armond et al. | 55/25 |
| 4,070,164 | 1/1978 | Miwa et al. | 55/26 |
| 4,144,037 | 3/1979 | Armond et al. | 55/58 |
| 4,144,038 | 3/1979 | Armond | 55/58 |
| 4,190,424 | 2/1980 | Armond et al. | 55/58 |
| 4,194,890 | 3/1980 | McCombs et al. | 55/18 |
| 4,194,891 | 3/1980 | Earls et al. | 55/26 |
| 4,239,509 | 12/1980 | Bligh et al. | 55/66 |
| 4,249,915 | 2/1981 | Sircar et al. | 55/26 |
| 4,264,340 | 4/1981 | Sircar et al. | 55/25 |
| 4,272,265 | 6/1981 | Snyder | 55/389 |
| 4,329,158 | 5/1982 | Sircar | 55/26 |
| 4,359,328 | 11/1982 | Wilson | 55/26 |
| 4,386,945 | 6/1983 | Gardner | 55/26 |
| 4,439,213 | 3/1984 | Frey et al. | 55/31 |
| 4,447,353 | 5/1984 | Pence et al. | 55/66 X |
| 4,448,592 | 5/1984 | Linde | 55/68 |
| 4,468,238 | 8/1984 | Matsui et al. | 55/26 |
| 4,472,177 | 9/1984 | Sircar | 55/21 |
| 4,472,178 | 9/1984 | Kumar et al. | 55/25 |
| 4,477,264 | 10/1984 | Kratz et al. | 55/25 |
| 4,477,265 | 10/1984 | Kumar et al. | 55/26 |
| 4,482,361 | 11/1984 | Whysall | 55/26 |
| 4,482,362 | 11/1984 | Yamazaki et al. | 55/62 |
| 4,508,548 | 4/1985 | Manatt | 55/158 |
| 4,515,605 | 5/1985 | Inoue et al. | 55/26 |
| 4,519,813 | 5/1985 | Hagiwara et al. | 55/26 |
| 4,529,412 | 7/1985 | Hayashi et al. | 55/25 |
| 4,552,570 | 11/1985 | Gravatt | 55/20 |
| 4,552,571 | 11/1985 | Dechene | 55/21 |

(List continued on next page.)

OTHER PUBLICATIONS

Kayser, J. C., and Knaebel, K. S., "Integrated Steps in Pressure Swing Adsorption Cycles," *Chemical Engineering Science*, vol. 43, No. 11, pp. 3015-3022 (1988).
Wilkerson, B. E., "The Adsorption of Argon and Oxygen on Silver Mordenite," Thesis Abstract, The Ohio State University (1990).

*Primary Examiner*—Robert Spitzer
*Attorney, Agent, or Firm*—Fay, Sharpe, Beall, Fagan, Minnich & McKee

[57] ABSTRACT

A pressure swing adsorption (PSA) process for splitting oxygen from a feed gas comprising 95% oxygen and 5% argon to achieve an oxygen purity of at least about 99.7% is provided. A column used in the PSA process includes therein a bed of silver mordenite, an adsorbent determined to be selective to argon. In a preferred embodiment, the feed gas has a pressure of about 10.7 atm and a flow rate of about 8.8-9.2 vol. per cycle/vol of column.

17 Claims, 8 Drawing Sheets

U.S. PATENT DOCUMENTS

| | | | |
|---|---|---|---|
| 4,566,881 | 1/1986 | Richter et al. | 55/25 |
| 4,599,094 | 7/1986 | Werner et al. | 55/26 |
| 4,614,525 | 9/1986 | Reiss | 55/25 |
| 4,627,860 | 12/1986 | Rowland | 55/162 |
| 4,636,225 | 1/1987 | Klein et al. | 55/31 |
| 4,636,226 | 1/1987 | Canfora | 55/68 |
| 4,648,888 | 3/1987 | Rowland | 55/21 |
| 4,661,124 | 4/1987 | Hamlin et al. | 55/21 |
| 4,661,125 | 4/1987 | Haruna et al. | 55/26 |
| 4,673,415 | 6/1987 | Stanford | 55/21 |
| 4,681,099 | 7/1987 | Sato et al. | 128/204.23 |
| 4,681,602 | 7/1987 | Glenn et al. | 55/21 |
| 4,717,397 | 1/1988 | Wiessner et al. | 55/26 |
| 4,732,584 | 3/1988 | Coe et al. | 55/66 |
| 4,744,803 | 5/1988 | Knaebel | 55/25 |
| 4,756,723 | 7/1988 | Sircar | 55/25 |
| 4,781,735 | 11/1988 | Tagawa et al. | 55/26 |
| 4,813,979 | 3/1989 | Miller et al. | 55/25 |
| 4,816,039 | 3/1989 | Krishnamurthy et al. | 55/26 |
| 4,869,733 | 9/1989 | Stanford | 55/21 |
| 4,943,304 | 7/1990 | Coe et al. | 55/66 |
| 4,985,052 | 1/1991 | Haruna et al. | 55/26 |
| 5,032,150 | 7/1991 | Knaebel | 55/20 |

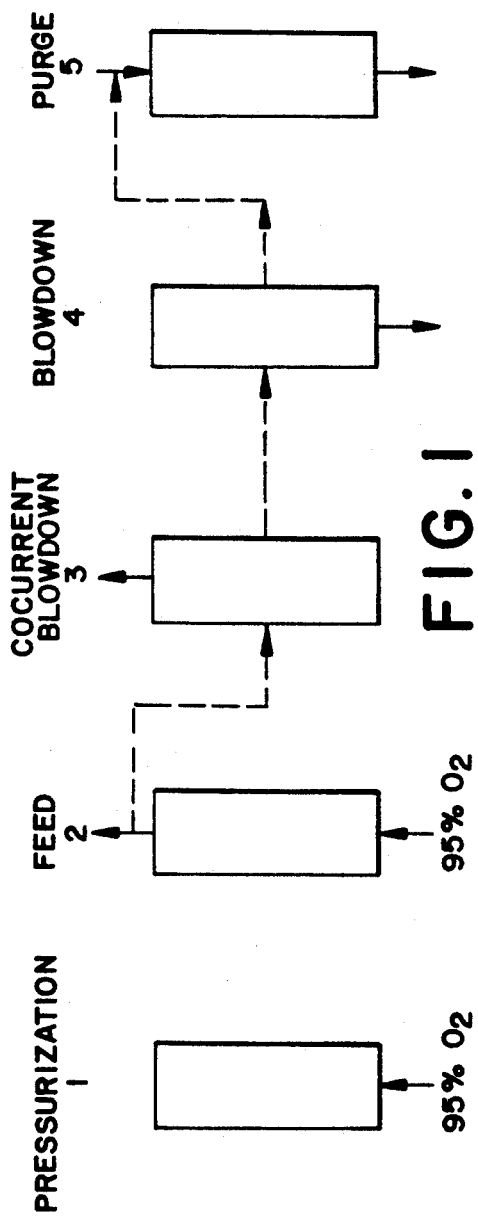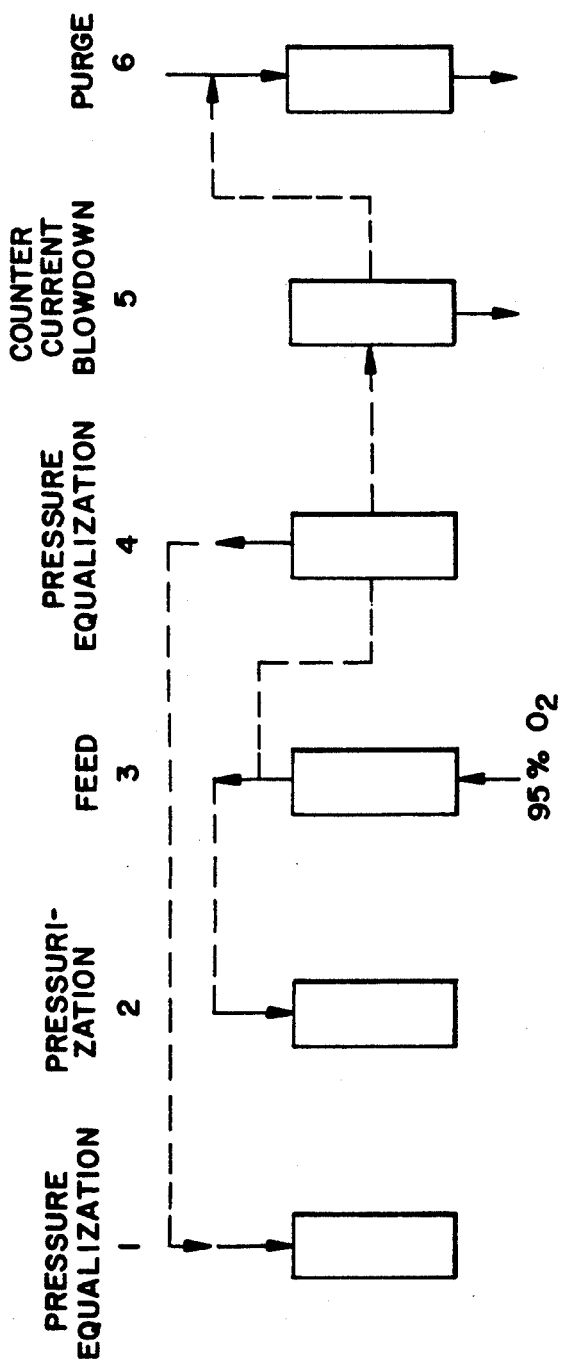

PRESSURE SWING ADSORPTION SYSTEM TO PURIFY OXYGEN

BACKGROUND OF THE INVENTION

This invention pertains to the art of pressure swing adsorption, and more particularly to the art of pressure swing adsorption to purify oxygen. The invention is predominately applicable to the art of splitting oxygen from argon in connection with pressure swing adsorption methods using an adsorbent selective to argon, and will be described with particular reference thereto. It will be appreciated, however, that the invention has broader applications and uses, such as in connection with removing argon from other gases including air, and may be advantageously employed in various environments. These other applications and uses are considered to be included within the scope of this invention.

Pressure swing adsorption (PSA) is a well-known method for separating gases. Typically, an adsorption column contains an adsorbent material that is selective toward one of the gases that is going to be separated. In standard operation of a pressure swing adsorption column, four steps are followed. First, feed gas (which is to be separated) is delivered under pressure to a previously pressurized column at a feed end thereof. During this step, the gas to be separated (the secondary product or "heavy" gas) is adsorbed onto the selective adsorbent material, and the remaining gas (the primary product or "light" gas) escapes through the product end of the column. As the feed passes through the column, the more strongly adsorbed component ("heavy") is selectively taken up. At the other end of the column, a continuous stream of purified, less strongly adsorbed component is taken off. As the bed reaches capacity, the product stream is closed off, and the blowdown step occurs.

The second or countercurrent blowdown step occurs whereby the column is vented to decrease the pressure. The previously adsorbed secondary product gas readily escapes from the column into a lower pressure area.

Third, the column is subjected to a purge step whereby primary product gas is recycled through the column in a direction countercurrent to the feed step in order to remove any of the adsorbed product remaining in the column and to regenerate the adsorbent bed. The purge step ceases when the purge stream reaches the product end of the column, at which point a valve at the feed end is closed to commence the pressurization step.

During this fourth or pressurization step, purified product continues to flow into the column. The column is pressurized by the purified primary product gas that is admitted through the product end of the column while the feed end is closed. This completes one PSA cycle. The next cycle begins with the feed step described above, and the steps are repeated.

A second PSA column may be operated 180 degrees out of phase with the cycle in the first column. This allows for a continuous feed stream that alternates between columns, as well as a continuous product stream.

With all of the above in mind, it has become desirable to devise a method for using PSA to produce a high purity oxygen product from air. The three major components of air include nitrogen (about 78%), oxygen (about 21%) and argon (about 1%).

It is known in the art of PSA to produce a stream of enriched oxygen from air by using adsorbents such as zeolite 5A or 13X, both of which are selective to the nitrogen component of air. Since argon, like oxygen, is non-polar and is not quadripolar (i.e., has virtually no quadripole moment), it adsorbs in a similar manner to oxygen. As a result of this similarity, most of the argon is present in the product stream with the oxygen when nitrogen selective adsorbents are used. Such stream has an oxygen product purity of roughly 95%, with the remaining 5% being argon.

It has become desirable to develop a method of further purifying the oxygen according to a pressure swing adsorption process. With a feed gas comprising oxygen and argon, the oxygen in such a method would become the primary product, and argon the secondary product. Such method would follow the PSA steps described above, or slight modifications thereto. The adsorbent used in such a method would be selective to argon. The separated oxygen would find usefulness in a variety of environments and applications such as in association with medical, industrial, aeronautical and experimental situations where highly purified oxygen is beneficial.

It is further desirable to develop a method for producing oxygen having at least a 99.6% purity at a recovery rate of at least about 25%. A desirable level of productivity would be about $11 Nm^3/m^3$ hr.

The present invention contemplates a method for recovering relatively high-purity oxygen from a gas comprising oxygen and argon at a ratio of about 21:1. The method involves a pressure swing adsorption system using an adsorbent material selective to argon. Favorable operating parameters have been determined as well.

BRIEF DESCRIPTION OF THE INVENTION

In accordance with the present invention, there is provided a process for splitting oxygen from a gas comprising oxygen and argon according to a pressure swing adsorption procedure. The resulting oxygen product has a purity of at least 99.6%. A ratio of oxygen to argon in the feed may be as low as 10:1. Such ratio may be as high as 25:1 or higher. As the ratio increases a higher purity oxygen product can be obtained. Along these lines, the process will provide desirable results at feed ratios of around 15:1 although a logical feed ratio of oxygen to argon is about 20:1 or 21:1. These latter ratios closely proximate the relative oxygen/argon content in air.

In accordance with a more limited aspect of the invention, a process for splitting oxygen from a feed gas such as air comprising oxygen and argon calls for a series of pressure swing adsorption steps. The steps of a preferred embodiment comprise a modification of the standard steps described above in the Background of the Invention section. Such preferred embodiment calls for five steps as opposed to four.

First, a feed gas is supplied to a PSA column through a feed end thereof. The column includes a bed of an adsorbent that selectively adsorbs argon, such as silver mordenite AgM(18). The feed gas may comprise air or, in the alternative, the predominately oxygen/argon product remaining after nitrogen has been separated out. In any event, the feed comprises oxygen and argon in about a 21:1 ratio. As the feed passes through the column, the argon is adsorbed onto the argon-selective adsorbent. An oxygen-rich effluent exits through a product end of the column. A front of argon proceeds through the column, but before it reaches the product end of the column to exit with the oxygen-rich effluent, the feed end of the column is closed.

Second, the column undergoes cocurrent blowdown. Here, a relatively pure stream of oxygen escapes through the product end of the column to a lower pressure vessel.

Third, the column is subjected to countercurrent blowdown. By this, the product end of the column is closed and the feed end of the column is opened. The previously separated argon which had been adsorbed onto the adsorbent escapes from the column, perhaps to a lower pressure tank.

Fourth, the column is purged with primary product oxygen gas. Any argon remaining in the column is forced out as effluent. The resulting exit stream may be flowed to a purge waste tank or vented to the atmosphere.

Fifth, the PSA column is pressurized with a gas that is a combination of gases from two sources. One such source is that of the feed product. The other source is the effluent from the cocurrent blowdown step.

In another embodiment of the invention, the pressurization may be conducted in a two step manner. The bed is initially pressurized with the cocurrent blowdown product. This is then followed by pressurization with the product from the feed step. The intent behind pressurizing using the combination or sequential feeding of the feed product and cocurrent blowdown product is to maintain high oxygen purity at the product end of the column.

The cycle is then repeated. In actual practice, a second column may operate at 180 degrees out of phase with the first column. Additional columns may also be used.

As discussed above, it is within the scope of this invention to have already split off the nitrogen from the air, feeding the column a gas comprising substantially about 95% oxygen and about 5% argon. It is also within the scope of this invention to include a "compound" bed inside the column. By this, the bed would be comprised of an adsorbent selective to water vapor, another adsorbent selective to nitrogen, and a third adsorbent selective to argon. The separation could occur in separate beds or a single bed.

A principal advantage of the present invention is the ability to recover high-purity oxygen from a gas such as air comprising oxygen and argon at a ratio of about 21:1. Still other advantages and benefits of the invention will become apparent to those skilled in the art upon a reading and understanding of the following detailed description.

BRIEF DESCRIPTION OF THE DRAWINGS

The invention may take physical form in certain parts and arrangements of parts, a preferred embodiment of which will be described in detail in this specification and illustrated in the accompanying drawings which form a part hereof.

FIGS. 1 and 2 represent schematic block diagrams representative of the steps involved in pressure swing adsorption processes of the invention.

DETAILED DESCRIPTION OF THE INVENTION

Figure 3:
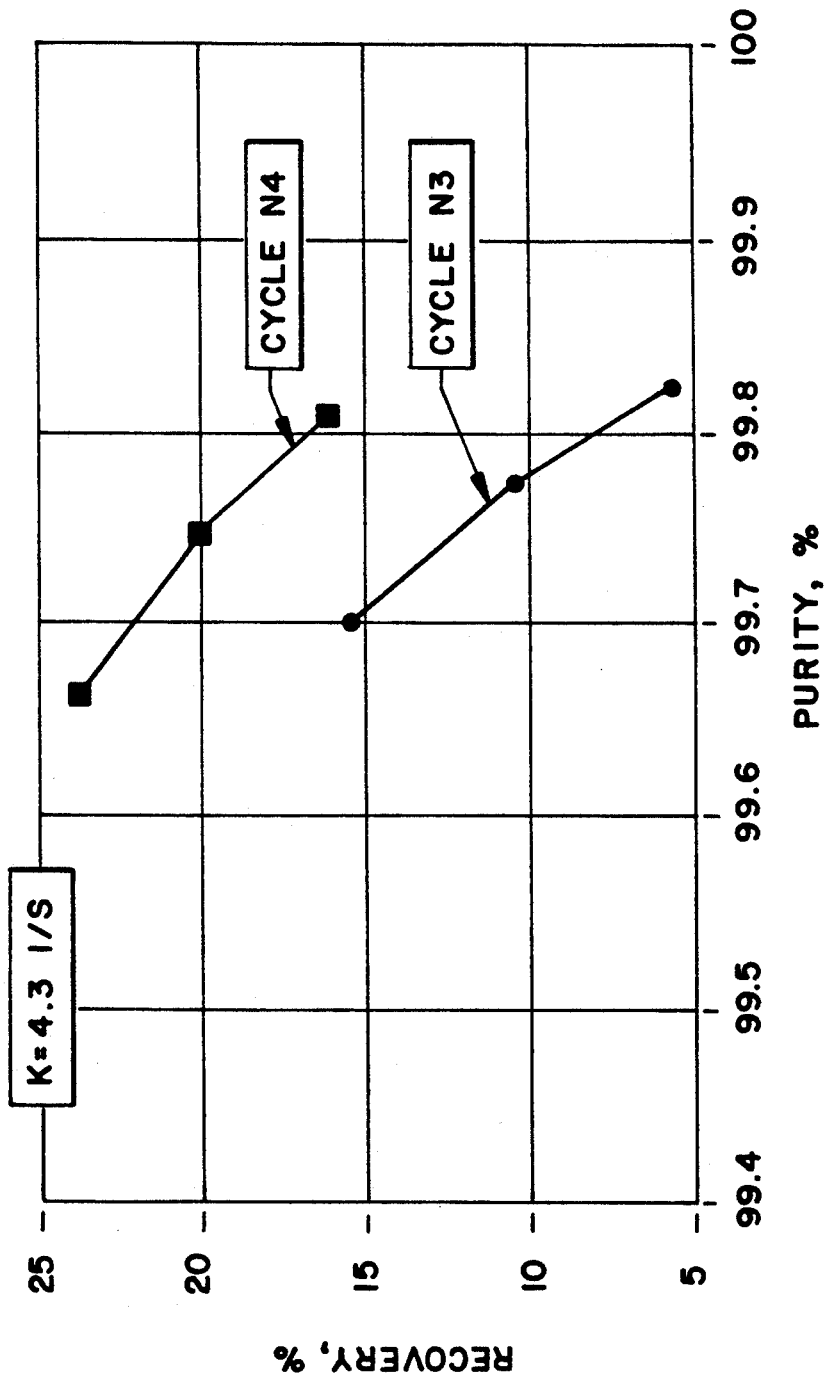
FIG. 3 is a graph comparing recovery and purity for two pressure swing adsorption cycles at a pressure of 10.7 atm., 60° C. and at a cycle time of 6 minutes.

Studies have been conducted to determine an absorbent suitable for splitting at least 99.7% oxygen from a mixture comprising about 5% argon, the balance oxygen. Since adsorption is fundamentally controlled by equilibrium, adsorption isotherms play an important role in adsorbent selection.

In typical PSA cycles, the light product is obtained at high pressure, and the byproduct (or heavy product) is exhausted at low pressure. Such cycles occur over a span of a few minutes. The rate or kinetics of adsorption can disguise the equilibrium behavior, and in extreme cases the equilibrium selectivity can be completely masked by differences in diffusion rates. Other properties that affect PSA performance or cost are the adsorbent's density and its need for preparation.

Adsorption isotherms for oxygen and argon have been measured in batchwise experiments, at pressures from subatmospheric to about 100 psia (7 atm.). The experiments were conducted using as adsorbents sodium mordenite, NaM, which contains no silver; copper mordenite, CuM; VSA-II; silver mordenite, AgM(2), containing about 5.5% by mass silver; and AgM(18), containing about 12% by mass silver. See, e.g., Wilkerson, B. E., "The Adsorption of Argon and Oxygen on Silver Mordenite," 1990.

It was determined that there is essentially no selectivity for ordinary mordenite or copper mordenite, and that selectivity for VSA-II decreases as temperature increases. Slight selectivity exists for AgM(2). Significant selectivity is exhibited for AgM(18) which contains the highest loading of silver from among the adsorbents tested.

Upon further testing of silver mordenite AgM(18), it was determined that the intraparticle diffusion resistance of the adsorbent plays a role in or governs adsorption. In attempting to achieve sharp separations via pressure swing adsorption, the intraparticle diffusion resistance should be minor. Diffusion in zeolites may occur in two modes, one corresponding to macropores (100Å) or larger, the other corresponding to micropores (3 to 10Å). Upon conducting experimentation on silver mordenite in both powder and pellet form, it was concluded that micropore diffusion controls the rate of adsorption in silver mordenite.

Silver mordenite AgM(18) tested to have a bulk density of about 0.968 to 0.973 g/cm$^3$; particle density of about 2.33 to 2.35 g/cm$^3$; void fraction of 0.584 to 0.589; silver weight percent of about 11.75 to 13.66%; and a sodium weight percent of about 0.31 to 0.39%. It was determined experimentally that the selectivity of AgM(18) toward argon decreases as temperature increases.

The inventors used a mathematical model to predict the results of a PSA system to purify oxygen. For preliminary assessment, a local equilibrium model approach was first followed. A goal of this approach was to identify a suitable cycle by considering perturbations of conventional cycles. Another goal was to identify appropriate operating conditions so that experimental verification would be facilitated.

Some of the results are based on extrapolations of experimental data. For example, the isotherm data did not extend to the highest pressures examined by the model. Likewise, the mass transfer results were inferred from data that did not exactly represent the conditions in a PSA system. Actual data from the PSA system indicates that discrepancies exist.

A second more rigorous model was then followed. The following assumptions are made in the second model: ideal gas behavior, negligible pressure drop along the bed, spherical pellets and crystals. The model is formulated for a two-component mixture and takes into account diffusion and convection fluxes in adsorbent macropores.

The model equations:

$$\epsilon \frac{\partial C_1}{\partial t} + \frac{\partial u C_1}{\partial l} + (1 - \epsilon)[\kappa(C_1 - \overline{C_1}) + JC_1] = D_e \frac{\partial^2 C_1}{\partial l^2} \quad (1)$$

$$\frac{\partial u}{\partial l} = -\frac{\epsilon}{P} \frac{\partial P}{\partial t} - (1 - \epsilon)J \quad (2)$$

$$\epsilon_p \frac{\partial \overline{C_1}}{\partial t} = \kappa(C_1 - \overline{C_1}) + JC_1 - \frac{\partial \overline{n_1}}{\partial t} \quad (3)$$

$$C_1 + C_2 = \overline{C_1} + \overline{C_2} = \frac{P}{RT} \quad (4)$$

$$\overline{n_1} = n_1 * (\overline{C_1}, \overline{C_2}, T); \overline{n_2} = n_2 * (\overline{C_1}, \overline{C_2}, T).$$

Assuming that mass transfer rates are very high, local equilibrium results between the gas and adsorbent. The theory that evolves from that approach is simplified and yields the best results possible from a PSA process. Such a theory cannot, however, predict product purity. Thus, although such theories are simple and usually predict recovery accurately, all simulations were done numerically using all the model equations.

The above equations can be used for simulation of all possible steps in PSA separation process. For each step there are boundary conditions of the model that both describe the cycle and permit the solution mathematically. These are given below.

| Feed | l = 0: | u = u_0, | C_1=C_{10}. |
|------|--------|----------|-------------|
|      | l = L: | dC_1/dl = 0. | |
| Purge | l = L: | u = u_0, | C_1=C_{10}. |
|      | l = 0: | dC_1/dl = 0. | |
| Blowdown | l = 0: | u = 0. | |
|      | l = L: | dC_1dl = 0. | |
| Pressurization | l = 0: | C_1=C_{10}. | |
|      | l = L | u = 0, | dC_1/dl = 0. |

Boundary conditions for blowdown and pressurization steps are shown for cocurrent direction. For countercurrent direction boundary conditions at l=0 and l=L must be switched. Initial conditions for each step are set at the final conditions of previous step. At the beginning of the modeling of the process initial conditions of the first step must be given.

In order to use the model, it is necessary to know the adsorption isotherms of the components to be separated, along with the diffusivity, bed void fraction, pellet porosity, and axial diffusion coefficient.

In laboratory-scale adsorbers axial diffusion is negligible so $D_z$ is approximately equal to zero. Experiments to determine adsorption isotherms of Ar and $O_2$, bed void fraction and pellet porosity were made earlier (Reichley 1991): $\epsilon = 0.387$; $\epsilon_p = 0.300$ Adsorption isotherm data were fit to Langmuir-type equations for Ar and $O_2$ from equilibrium experiments at various temperatures:

$$T = 30° C.: n_{Ar} = \frac{8.875 C_{Ar}}{1 + 0.0041 C_{Ar}}; n_{O_2} = \frac{7.363 C_{O_2}}{1 + 0.00307 C_{O_2}} \quad (5)$$

$$T = 60° C.: n_{Ar} = \frac{5.222 C_{Ar}}{1 + 0.0025 C_{Ar}}; n_{O_2} = \frac{4.155 C_{O_2}}{1 + 0.00166 C_{O_2}} \quad (6)$$

$$T = 90° C.: n_{Ar} = \frac{3.206 C_{Ar}}{1 + 0.00117 C_{Ar}}; n_{O_2} = \frac{2.629 C_{O_2}}{1 + 0.00108 C_{O_2}} \quad (7)$$

The value of the model's mass transfer coefficient, $\kappa$, was obtained from breakthrough experiments. It was initially determined that an approximate value of $\kappa$ at 30° C. and 1 atm from molecular theory and literature data about zeolite structure, is 8.113 s$^{-1}$. Then a more precise value was found from breakthrough experiments by comparison of theoretical (i.e., model) and experimental results at various values. Using this method values at various temperatures were determined. Excellent agreement was found between the model predictions and experiments at 90° C. and 60° C., and satisfactory agreement at 30° C.

In the calculations the main parameters of cycle performance were:

| T | temperature, °C. |
| Time | of cycle, min; |
| $V_f$ | volume of gas introduced to adsorber at feed step, |
| $V_{pg}$ | volume of product gas used for purge, |
| $Pr_h$ | highest pressure (atm), |
| $Pr_l$ | lowest pressure (purge pressure, atm) |
| $P_{bl}$ | intermediate pressure after cocurrent blowdown step. |

The main results of the simulation are:

| Pur | oxygen purity, |
| Rec | oxygen recovery (quantity of $O_2$ in product gas divided on quantity of $O_2$ in gas to be separated) |
| Prod | productivity (volume of product gas). |

All volumes here and below are dimensionless—they are per volume of adsorber and per cycle. For $V_f=0.5$, the adsorber volume is 2 liters and the cycle time is 5 minutes. In this case the volume of the feed during the cycle is $V_f*V_{ads}=0.5*2=1$ standard liter. The flow rate is $V_f*V_{ads}/5=0.2$ slpm. All this affects $V_{pg}$ and Prod also.

The present inventors have modified the standard four-step PSA process described above (i.e., pressurization, feed, countercurrent blowdown and purge) in order to increase recovery of purified oxygen by adding a cocurrent blowdown step between the feed and countercurrent blowdown steps. This modified version of the standard cycle is shown in FIG. 1. The five (5) different stages of the PSA process are represented by blocks 1-5 of FIG. 1. With attention to FIG. 1, the column is pressurized using a feed comprising about 95% oxygen and about 5% argon, as set forth in block 1, the pressurization block. The feed enters at a first or feed end of the column. Next, block 2 (feed block) shows feed comprising 95% oxygen entering into the column at the feed end. An oxygen rich stream exits from the product end of the column represented by block 2. Succeeding block 3 represents a cocurrent blowdown step where additional oxygen rich cocurrent blowdown product emerges through the feed end. Block 4 demonstrates that a blowdown step occurs whereby argon exits through the feed end. Finally, as shown in block 5, the column is purged with the oxygen rich product stream from the feed step of block 2.

The modified cycle just described has been determined upon calculation to provide less-than-satisfactory results. The desirable purity level of 99.7% oxygen in the product stream could not be achieved at a feasible range of operating conditions. The results of the tests using that cycle provided a purity level below 99%.

The modified cycle discussed above and shown in FIG. 1 was further modified by replacing the step of pressurization by feed with pressurization by a mixture of product from the feed step and product from the cocurrent blowdown step. This version was designated Cycle N3. It was determined that cycle N3 provides improved results over the standard four-step cycle modification of FIG. 1. By decreasing blowdown pressure, an increased quantity of product gas may be realized along with increased recovery and productivity. Results of Cycle N3 at 90° C. and a pressure of 10.7 atm. show a less-than-desirable purity for short cycles (i.e., cycles less than 8 minutes). Results are better than those at 5.35 atm., but they improve still more if the cycle time is raised to a range of about 8 to 12 minutes. Similar results were obtained at 60° C.

Cycle N3 was modified by pressurizing the column in two separate steps. First, the product from the cocurrent blowdown (the less pure product) was used for initial pressurization. Second, the product from the feed step (the purer product) was used for the final pressurization. This cycle is referred to as Cycle N4. A diagram showing the steps of Cycle N4 is shown in FIG. 2. Here, it can be seen that at block 3, product from the feed is sent to block 2, the second pressurization step. Product from block 4, the cocurrent pressurization step, is shown as being used in block 1, representative of the initial pressurization or equalization step. Block 5 shows the counter current blowdown step wherein the less desirable product argon exits through the feed end of the column. Finally, block 6 represents the feed step. As will be noted, product from the feed step, the purer product, is used to purge the column at block 6. Argon-contaminated waste exits through the feed end after the purge step.

FIG. 3 represents a comparison of Cycles N3 and N4 at an operating temperature of about 60° C. and a maximum pressure of about 10.7 atm. (157 psia), with the conditions and results summarized in Table 1. In FIG. 3, the quantity of feed is varied and the resulting purity and recovery are plotted. The results shown for cycle N4 are more desirable than those for Cycle N3. As such, additional experimentation was conducted for Cycle N4.

TABLE 1

Comparison of Cycles N3 and N4. $k = 4.3 \text{ s}^{-1}$.

| Trial No. | Cycle | $V_f$ | $V_{pg}$ | Purity % | Recovery % | Prod. per cycle | Prod. per hr. |
|---|---|---|---|---|---|---|---|
| 1 | N3 | 7.0 | 0.5 | 99.82 | 5.34 | 0.355 | 3.55 |
| 2 | N3 | 7.4 | 0.5 | 99.77 | 10.6 | 0.745 | 7.45 |
| 3 | N3 | 7.8 | 0.5 | 99.7 | 15.32 | 1.135 | 11.35 |
| 4 | N4 | 8.2 | 0.5 | 99.81 | 16.06 | 1.25 | 12.5 |
| 5 | N4 | 8.6 | 0.5 | 99.75 | 20.08 | 1.64 | 16.4 |
| 6 | N4 | 9.0 | 0.5 | 99.67 | 23.73 | 2.028 | 20.28 |

Figure 4:
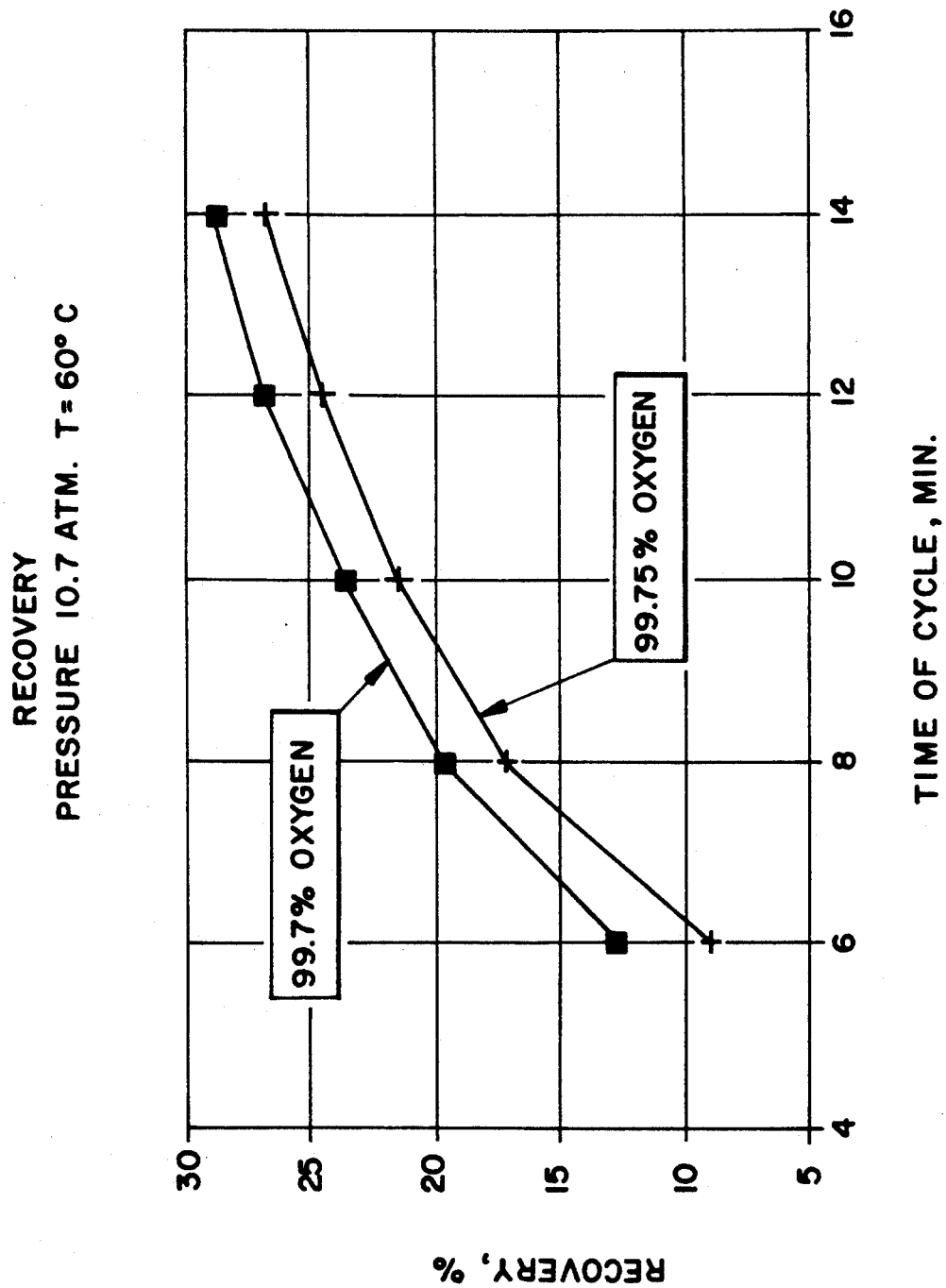
FIG. 4 is a graph comparing recovery and cycle time of two pressure swing adsorption cycles at a pressure of 10.7 atm. and a temperature of 60° C.
Figure 5:
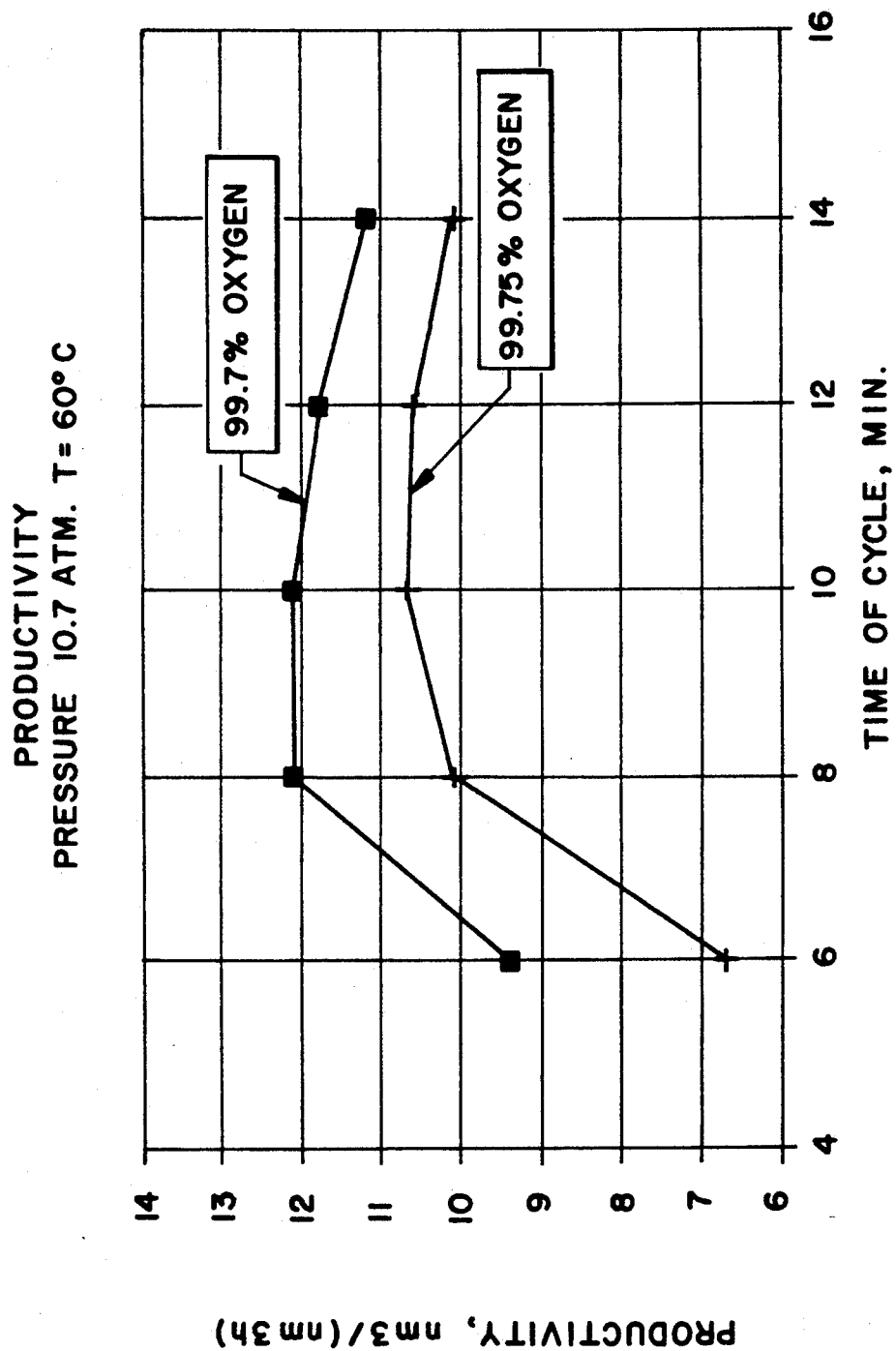
FIG. 5 is a graph comparing productivity and cycle time of two pressure swing adsorption cycles at a pressure of 10.7 atm. and a temperature of 60° C.

Results of a number of simulations of Cycle N4 at 60° C. and 10.7 atm., and a mass transfer constant 2.8 s$^{-1}$ are summarized in Table 2. Mass transfer coefficient $\kappa$ has been determined from breakthrough experiments. As will be noted, an increase in the cycle time results in an increase in recovery and cycle productivity. This is further shown in FIGS. 4 and 5, respectively. It was noted that increasing cycle time further results in a sharper adsorption front with additional pure product gas. Increasing cycle time increased recovery up to the equilibrium limit.

TABLE 2

Results of Modeling for Process N4 at 60° C. and 10.7 atm.

| Trial No. | Cycle Time | $V_f$ | Purity % | Recovery % | Prod. per cycle | Prod. per h |
|---|---|---|---|---|---|---|
| 1 | 6 | 7.6 | 99.75 | 9.185 | 0.663 | 6.63 |
| 2 | 6 | 8.0 | 99.68 | 13.848 | 1.052 | 10.52 |
| 3 | 6 | 8.4 | 99.59 | 18.06 | 1.44 | 14.41 |
| 4 | 6 | 8.8 | 99.5 | 21.88 | 1.83 | 18.3 |
| 5 | 8 | 8.0 | 99.8 | 13.88 | 1.055 | 7.91 |
| 6 | 8 | 8.4 | 99.73 | 18.1 | 1.44 | 10.83 |
| 7 | 8 | 8.8 | 99.65 | 21.93 | 1.83 | 13.75 |
| 8 | 8 | 9.2 | 99.56 | 25.41 | 2.22 | 16.66 |
| 9 | 10 | 8.4 | 99.81 | 18.13 | 1.45 | 8.68 |
| 10 | 10 | 8.8 | 99.74 | 21.96 | 1.83 | 11.01 |
| 11 | 10 | 9.4 | 99.61 | 27.08 | 2.42 | 14.51 |
| 12 | 12 | 8.8 | 99.8 | 21.98 | 1.84 | 9.185 |
| 13 | 12 | 9.2 | 99.73 | 25.47 | 2.23 | 11.13 |
| 14 | 12 | 9.6 | 99.65 | 28.66 | 2.61 | 13.07 |
| 15 | 14 | 8.8 | 99.84 | 21.99 | 1.84 | 7.88 |
| 16 | 14 | 9.2 | 99.78 | 25.49 | 2.23 | 9.55 |

Cycle time affects productivity more subtly. On one hand, increasing the time and recovery leads to increasing cycle productivity. The number of cycles per unit of time, however, decreases. Consequently, productivity passes through a maximum. As the desired purity of the product gas increases, the maximum shifts to longer cycles. Thus, cycle time of about 10-12 minutes may be preferable for producing desired results.

Similar results were found at the pressure range of about 0.4 to 4.0 atm as shown in Table 3. Here, high recovery, high purity, and high productivity are possible at cycle times of 7 to 15 minutes.

TABLE 3

Process at T = 60° C.; Pressure Range 0.4-4.0 atm. Cycle N4.

| Trial No. | Cycle Time (min.) | $V_f$ | $V_{pg}$ | Purity % | Recovery % | Prod. per cycle | Prod. per hr. |
|---|---|---|---|---|---|---|---|
| 1 | 8 | 3.5 | 0.3 | 99.73 | 5.83 | 0.194 | 1.455 |
| 2 | 8 | 3.8 | 0.3 | 99.57 | 13.52 | 0.488 | 3.66 |
| 3 | 10 | 3.6 | 0.3 | 99.77 | 8.54 | 0.292 | 1.752 |
| 4 | 10 | 3.8 | 0.3 | 99.65 | 13.53 | 0.488 | 2.928 |
| 5 | 12 | 3.4 | 0.3 | 99.89 | 2.97 | 0.096 | 0.479 |
| 6 | 12 | 3.6 | 0.3 | 99.81 | 8.55 | 0.292 | 1.46 |
| 7 | 12 | 3.8 | 0.3 | 99.71 | 13.54 | 0.489 | 2.445 |
| 8 | 12 | 4.0 | 0.3 | 99.57 | 18.01 | 0.684 | 3.42 |
| 9 | 14 | 3.8 | 0.3 | 99.75 | 13.54 | 0.489 | 2.09 |
| 10 | 14 | 4.1 | 0.3 | 99.54 | 20.09 | 0.782 | 3.35 |
| 11 | 16 | 3.8 | 0.3 | 99.78 | 13.55 | 0.489 | 1.83 |

TABLE 3-continued

| | | Process at T = 60° C.; Pressure Range 0.4-4.0 atm. Cycle N4. | | | | |
|---|---|---|---|---|---|---|
| Trial No. | Cycle Time (min.) | $V_f$ | $V_{pg}$ | Purity % | Recovery % | Prod. per cycle | Prod. per hr. |
| 12 | 16 | 4.1 | 0.3 | 99.58 | 20.1 | 0.783 | 2.93 |
| 13 | 16 | 4.3 | 0.3 | 99.31 | 25.7 | 1.075 | 4.03 |
| 14 | 18 | 3.8 | 0.3 | 99.8 | 13.55 | 0.489 | 1.63 |
| 15 | 18 | 4.0 | 0.3 | 99.68 | 18.03 | 0.685 | 2.28 |
| 16 | 18 | 4.2 | 0.3 | 99.53 | 22.07 | 0.88 | 2.93 |

Increasing the mass transfer constant leads to a sharper front and improved performance, Since $\kappa$ depends on temperature, pressure and adsorbent particle size. By choosing these parameters, it is possible to at least partially control the rate of mass transfer. By increasing mass transfer $\kappa$ by 53.5% (from $\kappa=4.3$ S$^{-1}$ and from $\kappa=2.8$ s$^{-1}$), a 53.5% increase in recovery and productivity may be realized.

Pressure affects separation performance. For example, Table 4 shows data for the process at 60° C. and 21.7 atm. Recovery at this pressure exceeds 25% and productivity is about 25 Nvol/(vol hr) at the desired purity. In order to find the equilibrium limit for this process, calculations were made with $\kappa$ at 28.0 s$^{-2}$ and $\kappa=100.0$ s$^{-2}$. These values represent an increase of $\kappa$ of 10 and 35.7 times, respectively. At $\kappa=28.0$ s$^{-2}$, the recovery is about 50% for a productivity greater than 70 Nvol/(vol hr). At $\kappa=100.0$ s$^{-2}$ equilibrium was nearly achieved, with recovery at about 55% and productivity at about 80 Nvol/(vol hr).

TABLE 4

| | | Process at 60° C., Pressure 21.4 atm, Cycle N4, 10 min, $k = 2.8$ s$^{-1}$. | | | |
|---|---|---|---|---|---|
| N | Feed | Pe | Purity % | Recovery % | Prod. per cycle | Prod. vol/(vol hr) |
| 1 | 15.0 | 10,000 | 99.85 | 21.01 | 2.99 | 17.843.55 |
| 2 | 16.0 | 10,000 | 99.79 | 26.09 | 3.97 | 23.82 |
| 3 | 17.0 | 10,000 | 99.72 | 30.5 | 4.93 | 29.58 |
| 4 | 17.0 | 100 | 99.65 | 30.5 | 4.93 | 29.58 |
| 5 | 18.0 | 10,000 | 99.64 | 34.52 | 5.9 | 35.4 |

The invention will now be further described by the following examples.

EXAMPLES

Several PSA experiments were conducted in an attempt to split oxygen having about a 99.7% purity from a feed comprising about 95% oxygen and about 5% argon. These experiments were conducted using silver mordenite AgM(18) as the adsorbent. The steps involved in the experiments comprised pressurization, feed, cocurrent blowdown, countercurrent blowdown and purge. Purified oxygen was produced during the feed and cocurrent blowdown steps. This was described above as Cycle N3.

Figure 6:
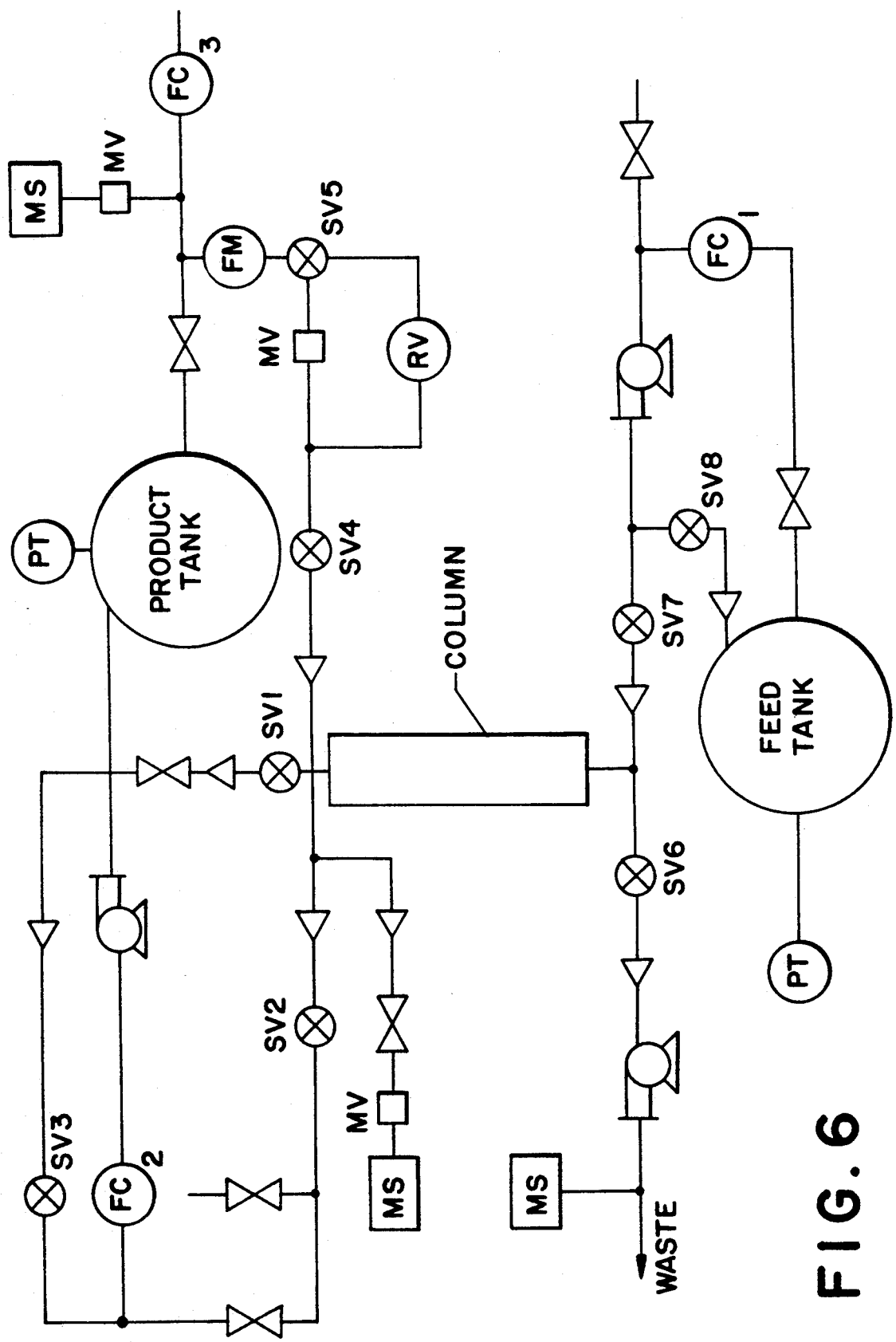
FIG. 6 is a schematic of the experimental apparatus used for laboratory pressure swing adsorption tests using silver mordenite as the adsorbent.

With reference to FIG. 6, a schematic representation of the system used in conducting these experiments is set forth. The equipment, instruments and system used in the example practices of the PSA method of the invention are shown. The schematic format of FIG. 6 may be better understood with a view toward first understanding the legends shown therein. The various components are abbreviated as follows: PT—pressure transducer; FC—flow controller; FM—flow meter; MS—mass spectrometer; SV—solenoid valve; and MV—metering valve. In particular, FC$_1$ to a first flow controller. FC$_2$ and FC$_3$ refer to second and third flow controllers, respectively. Similarly, SV1 refers to a first solenoid. SV2 refers to a second solenoid valve. SV3, SV4, SV5, SV6, SV7 and SV8 refer to third, fourth, fifth, sixth, seventh and eighth solenoid valves, respectively.

A single column was used in the system. The column was filled with silver mordenite AgM(18) adsorbent.

Oxygen purity was measured by a Perkin-Elmer MGA-1200 mass spectrometer. Generally, there was a slight discrepancy between the composition indicated on the meter of the mass spectrometer and the analog output received by the computer.

Experimental conditions for all the silver mordenite experiments are summarized in Table 5. The results for Experiments 5-8 are summarized in Tables 6-9. Detailed results for Experiments 4 were recorded via computer, but only final results were recorded manually. In that experiment, 16 cycles were completed, and the ultimate oxygen purity was 99.5 to 99.6%. When corrected for losses due to sampling, the recovery was estimated to be about 9.8% to 12.1%.

TABLE 5

| | PSA Experiments with Silver Mordenite: Conditions | | | |
|---|---|---|---|---|
| No./Date | STEP OR DEVICE | DURATIONS (s) | SET POINT | ACTUAL VALUE (std. l/min) |
| 1/2-21-92 | PURGE | 120 | 3 | 0.03 |
| | PRESSURIZATION | 60 | — | — |
| | FEED | 180 | 14.8 | 1.46 |
| | Co-BD | 120 | 15.6 | 1.56 |
| | BLOWDOWN | 120 | — | — |
| 2/2-24-92 | PURGE | 140 | 3 | 0.03 |
| | PRESSURIZATION | 60 | — | — |
| | FEED | 180 | 14.7 | 1.63 |
| | Co-BD | 120 | 15.6 | 1.56 |
| | BLOWDOWN | 100 | 32.0 | 3.10 |
| 3/2-25-92 | PURGE | 120 | 2.6 | 0.3 |
| | PRESSURIZATION | 60 | — | — |
| | FEED | 240 | 6.8 | 0.86 |
| | Co-BD | 120 | 11.0 | 1.15 |
| | BLOWDOWN | 120 | 10.0 | 1.20 |
| 4/2-25-92 | PURGE | 90 | 2.6 | 0.3 |
| | PRESSURIZATION | 60 | — | — |
| | FEED | 240 | 6.8 to 8.0 | 0.86 to 1.02 |
| | Co-BD | 120 | 11.0 to 10.5 | 1.15 to 1.10 |
| | BLOWDOWN | 150 | — | — |
| 5/2-26-92 | PURGE | 90 | 2.6 | 0.3 |
| | PRESSURIZATION | 60 | — | — |

TABLE 5-continued

PSA Experiments with Silver Mordenite: Conditions

| No./Date | STEP OR DEVICE | DURATIONS (s) | SET POINT | ACTUAL VALUE (std. 1/min) |
|---|---|---|---|---|
| | FEED | 240 | 8.0 | 0.95 |
| | Co-BD | 60 | 22.5 | 2.3 |
| | BLOWDOWN | 150 | — | — |
| 6/2-27-92 | PURGE | 90 | 2.6 | 0.3 |
| | PRESSURIZATION | 60 | — | — |
| | FEED | 240 | 8.0 | 1.018 |
| | Co-BD | 60 | 25.5 | 2.55 |
| | BLOWDOWN | 150 | — | — |
| 7/2-28-92 | PURGE | 90 | 2.6 | 0.3 |
| | PRESSURIZATION | 60 | — | — |
| | FEED | 270 | 8.0 | 1.018 |
| | Co-BD | 30 | 54.0 | 5.0 |
| | BLOWDOWN | 150 | — | — |
| 8/3-3-92 | PURGE | 90 | 4.5 | 0.18 |
| | PRESSURIZATION | 120 | — | — |
| | FEED | 240 | 6.0 | 0.77 |
| | Co-BD | 30 | 40.0 | 3.9 |
| | BLOWDOWN | 150 | — | — |

TABLE 6

PSA Experimental Results: No. 5

| CYCLE | PRODUCT TANK PRESSURE (psia) | | | | | PRODUCT OVER CYCLE |
|---|---|---|---|---|---|---|
| | PU | PR | FEED | Co-BD | BD | |
| 20 | 61.72 | 59.36 | 61.18 | 62.15 | 61.88 | |
| 21 | 61.83 | 59.47 | 61.28 | (62.25) | 61.99 | |
| ΔP (psia) | 0.11 | 0.11 | 0.10 | (0.10) | 0.11 | |
| ΔN (mol) | | | | | | 0.11 |
| $R_{app}$ | | | | | | 6.84% |
| 22 | 61.94 | 59.58 | 61.38 | 62.35 | 62.08 | |
| ΔP (psia) | 0.11 | 0.11 | 0.10 | 0.10 | 0.10 | |
| ΔN (mol) | | | | | | 0.11 |
| $R_{app}$ | | | | | | 6.69% |
| 23 | 62.04 | 59.67 | (61.48) | 62.45 | 62.19 | |
| $Y_{ArMAX}$ | 0.106 | — | — | — | 0.092 | |
| ΔP (psia) | 0.10 | 0.09 | (0.10) | 0.10 | 0.10 | |
| ΔN (mol) | | | | | | 0.010 |
| 24 | 62.14 | 59.76 | 61.58 | — | — | |
| $Y_{ArMAX}$ | 0.107 | — | — | — | 0.0915 | 0.004 |
| ΔP (psia) | 0.10 | 0.11 | 0.10 | — | — | |
| ΔN (mol) | | | | | | 0.011 |
| $R_{app}$ | | | | | | 6.58% |
| 29 | — | — | 60.61 | — | — | |
| $Y_{ArMAX}$ | 0.1095 | — | — | — | 0.093 | 0.005 |

TABLE 7

PSA Experimental Results: No. 6

| CYCLE | PRODUCT TANK PRESSURE (psia) | | | | | PRODUCT OVER CYCLE |
|---|---|---|---|---|---|---|
| | PU | PR | FEED | Co-BD | BD | |
| 8 | — | — | 61.49 | 62.58 | 62.33 | |
| 9 | — | 59.88 | 61.60 | 62.67 | 62.42 | |
| $Y_{ArMAX}$ | 0.119 | — | — | — | 0.095 | |
| ΔP (psia) | — | — | 0.11 | 0.11 | 0.09 | |
| ΔN (mol) | | | | | | 0.011 |
| $R_{app}$ | | | | | | 6.30% |
| 10 | — | 59.97 | 61.69 | 62.76 | 62.51 | |
| ΔP (psia) | — | 0.09 | 0.09 | 0.09 | 0.09 | |
| ΔN (mol) | | | | | | 0.0094 |
| $R_{app}$ | | | | | | 5.44% |
| 11 | — | 59.95 | — | — | 62.30 | |
| ΔP (psia) | — | 0.09 | (0.10) | 0.10 | 0.10 | |
| ΔN (mol) | | | | | | 0.0105 |
| $R_{app}$ | | | | | | 6.08% |
| 12 | 62.14 | 59.76 | 61.58 | — | — | |
| ΔP (psia) | 0.10 | 0.11 | 0.10 | — | — | |
| ΔN (mol) | | | | | | 0.011 |
| $R_{app}$ | | | | | | 6.25% |
| 27 | 62.23 | — | — | — | — | |
| 28 | 62.36 | — | — | — | — | |
| $Y_{ArMax}$ | 0.127 | — | — | — | — | 0.0055 |
| ΔP (psia) | 0.13 | — | — | — | — | |

TABLE 7-continued

PSA Experimental Results: No. 6

| CYCLE | PRODUCT TANK PRESSURE (psia) | | | | | PRODUCT OVER CYCLE |
|---|---|---|---|---|---|---|
| | PU | PR | FEED | Co-BD | BD | |
| ΔN (mol) | | | | | | 0.014 |
| $R_{app}$ | | | | | | 7.87% |

TABLE 8

PSA Experimental Results: No. 7

| CYCLE | PRODUCT TANK PRESSURE (psia) | | | | | PRODUCT OVER CYCLE |
|---|---|---|---|---|---|---|
| | PU | PR | FEED | Co-BD | BD | |
| 12 | 70.56 | 68.05 | 69.97 | — | 70.83 | |
| $Y_{ArMAX}$ | 0.120 | — | — | — | 0.077 | |
| 13 | 70.77 | 68.24 | 70.13 | — | 71.00 | |
| $Y_{ArMAX}$ | 0.123 | — | — | — | 0.078 | |
| ΔP (psia) | 0.21 | 0.19 | 0.16 | — | 0.17 | |
| ΔN (mol) | | | | | | 0.0178 |
| $R_{app}$ | | | | | | 9.16% |
| 16 | 70.62 | 68.14 | 70.04 | — | 70.90 | |
| 17 | — | 68.30 | 70.19 | 71.45 | 71.04 | |
| ΔP (psia) | (0.18) | 0.16 | 0.15 | — | 0.14 | |
| ΔN (mol) | | | | | | 0.0168 |
| $R_{app}$ | | | | | | 8.63% |
| $Y_{ArPROD}$ | (After Cycle No. 25) | | | | | 0.0055 |
| $Y_{ArPROD}$ | (After Cycle No. 38) | | | | | 0.0085 |

TABLE 9

PSA Experimental Results: No. 8

| CYCLE | PRODUCT TANK PRESSURE (psia) | | | | | AVERAGE OVER CYCLE |
|---|---|---|---|---|---|---|
| | PU | PR | FEED | Co-BD | BD | |
| 33 | 68.60 | 66.87 | 68.23 | 68.17 | 68.87 | |
| 34 | 68.73 | 66.99 | 68.34 | 68.28 | 68.99 | |
| ΔP (psia) | 0.13 | 0.12 | 0.11 | 0.11 | 0.12 | |
| ΔN (mol) | | | | | | 0.0124 |
| $R_{app}$ | | | | | | 9.5% |
| $Y_{ArPROD}$ | | | | | | 0.0067 |

Figure 7:
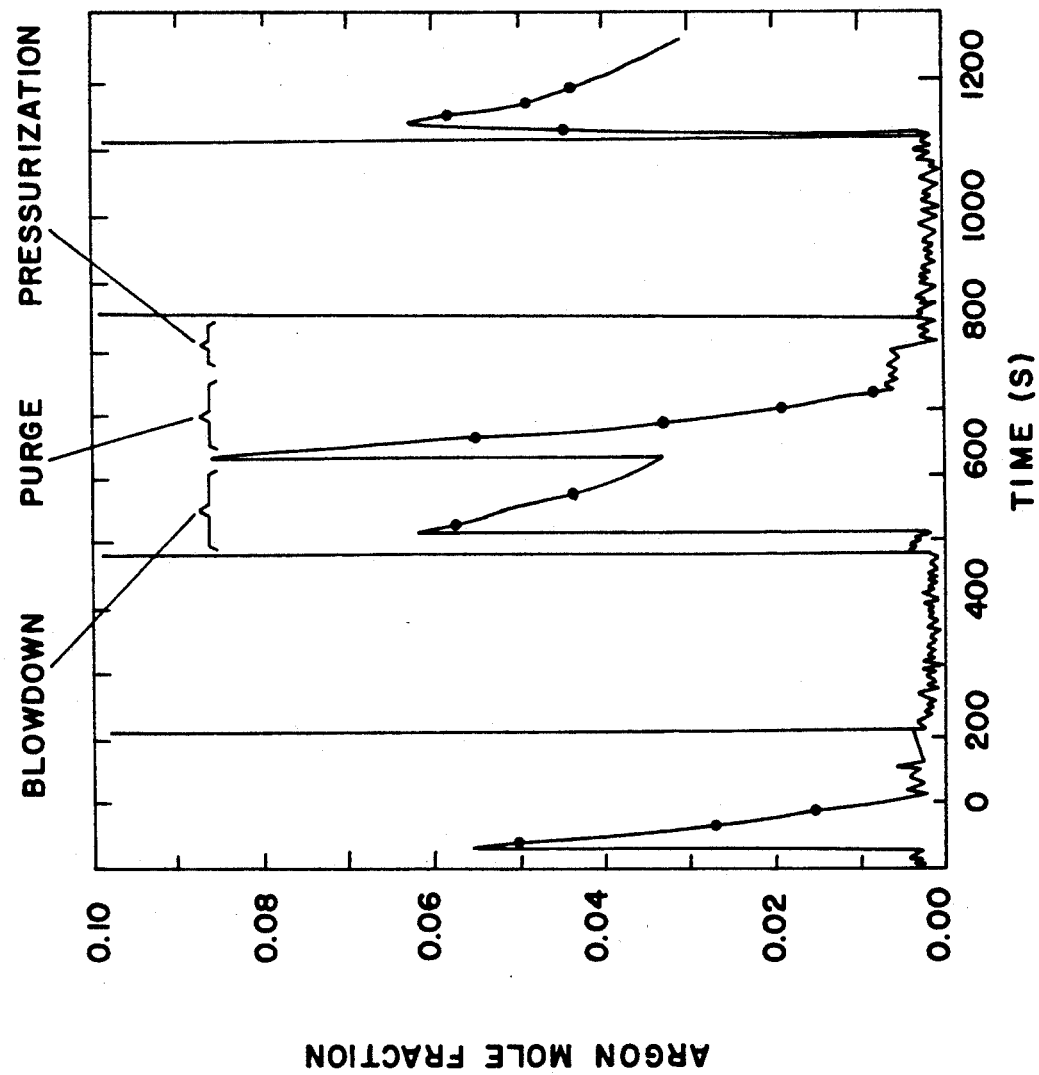
FIG. 7 is a graph showing an argon effluent composition in experiment 8 discussed herein. Vertical bars separate pressurization and feed, and cocurrent blowdown and blowdown.
Figure 8:
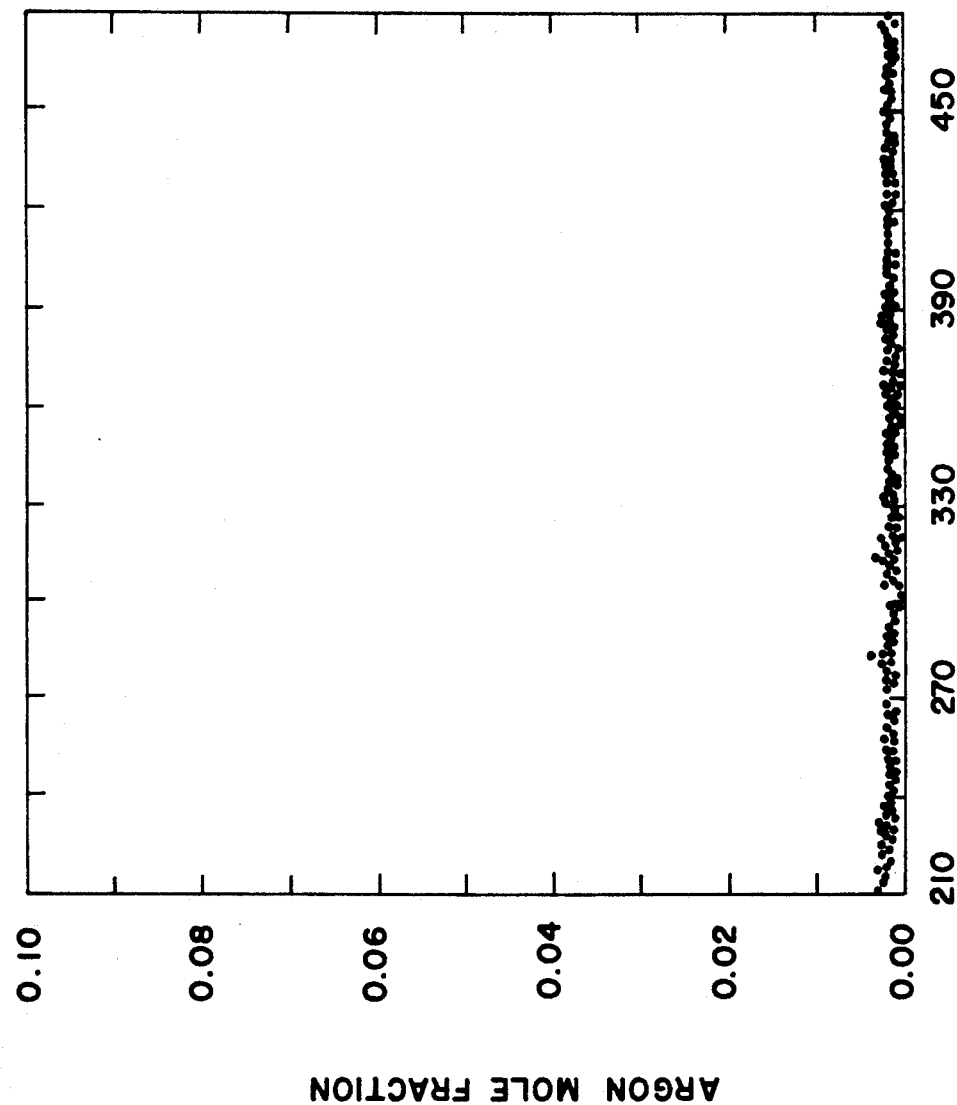
FIG. 8 is a graph showing the argon mole fraction in pressure swing adsorption experiment 8 at feed and blowdown steps in cycle 35. The break between steps is at 450 seconds.

Examples of analog values of argon mole fraction from Experiment 8 are shown in FIGS. 7 and 8. The former shows effluent during two entire cycles as time elapsed. The latter shows only the first feed and cocurrent blowdown product. These show an average argon content in the gross product of slightly less than 0.3%. The observed value in the product tank was higher, about 0.67%. A similar observation was made during the experiments: the product composition during the feed and cocurrent blowdown steps was commonly lower in argon than was subsequently observed in the product tank. The possible causes of this discrepancy are uncertain. Possibilities include instrument error and/or faulty sampling, probably during cocurrent blowdown.

Figure 9:
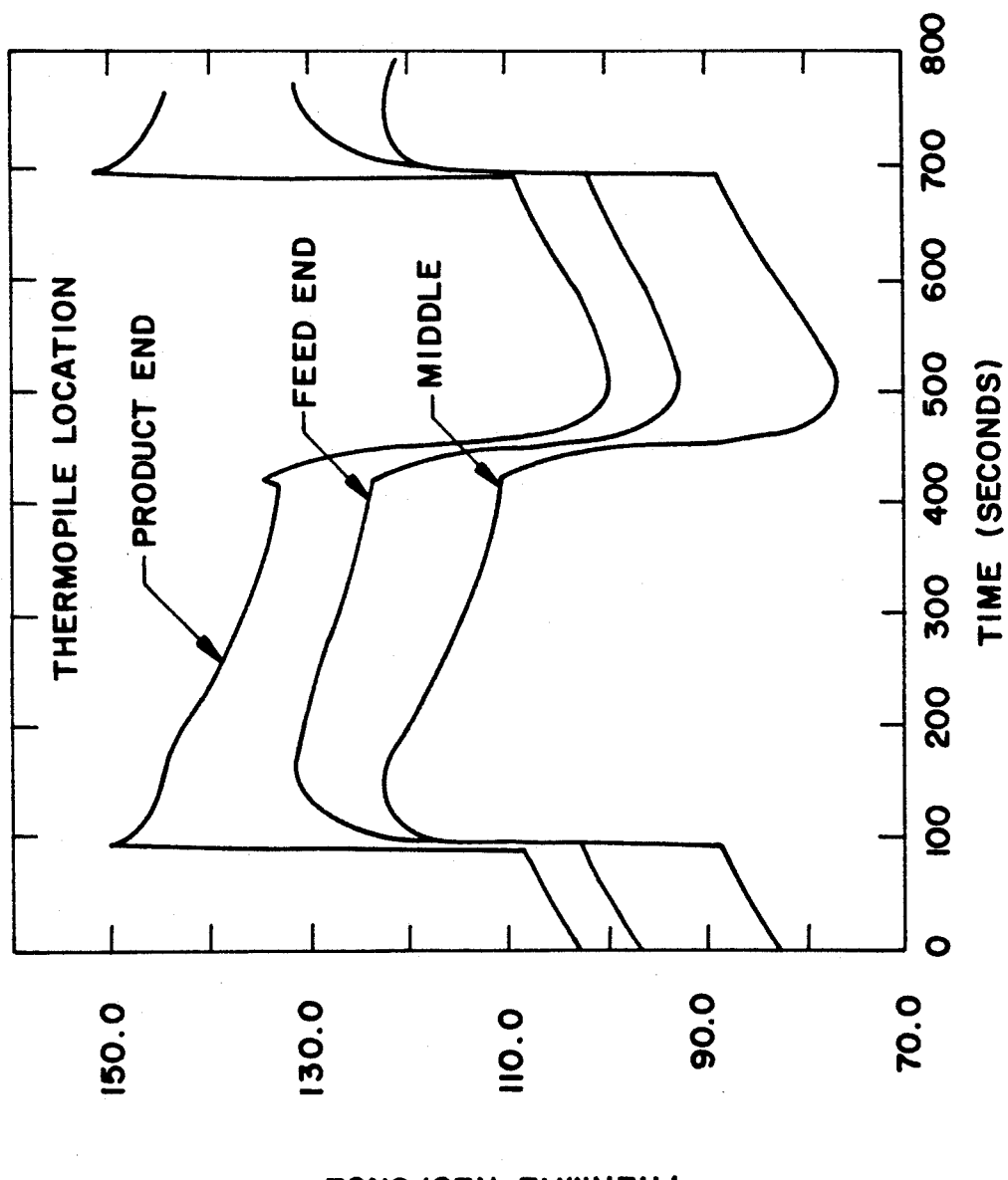
FIG. 9 is a graph showing bed temperature response for AgM PSA at 60° C., from experiment 7.

Similarly, the temperature responses, recorded via thermopile inserted in the adsorbent bed, are shown in FIG. 9. It is to be noted that the ordinate in FIG. 9 is not pure temperature since the signal was amplified by the multiple junction thermopile and then separately amplified and scaled. There does not appear to be a visible thermal wave. If one existed, a sharp rise should be observed early in the feed step (after the sharp rise due to pressurization), at the feed end first, then at the midpoint. There is a small rise at the product end of the cocurrent blowdown step, but this is probably an artifact, since no corresponding peak of argon was observed in the product. It is completely possible that the cycle could be controlled by monitoring the temperature profiles at the product end of the bed.

Another observation made from the experiments is the vast difference in diffusion rates of argon and oxygen. This was most apparent during blowdown. When depressurizing from about 30 psia down to about 5 psia, the effluent was richer in oxygen than in the feed. Only as the absolute pressure dipped below 5 psia did the composition of the effluent shift to be higher in argon than in the feed. The percentage of argon in the effluent typically increased during blowdown, even though the flow rate diminished. The composition typically achieved a maximum in argon during the purge step. Breakthrough experiments did not exemplify this behavior since they occurred at constant pressures.

Calculations were done to compare theoretical results with the experimental observations. Simulations were done of the process at 60° C. and at 90° C., and a pressure range of 0.4 atm to 4.0 atm. Cycle N4 (FIG. 2) was used, although Cycle N3 was actually used in the laboratory-scale unit. The results are shown in Table 10.

Conversely, at 90° C. the predicted purity, recovery, and productivity are about the same as those achieved experimentally. Diffusions rates in zeolite are higher (and probably more nearly equivalent) at high temperatures for two reasons: diffusivity is a strong function of temperature and the pore size of the zeolite actually increases with temperature.

Because of the accuracy at the higher temperatures, it is reasonable to expect that the predictions at lower temperatures will improve.

Based on the above experiments and discussion, it can be concluded that separation of 5% argon/95% oxygen mixture with an oxygen purity of 99.7% is possible using AgM(18) adsorbent and cycle N3 or N4. The most desirable results are achieved for a process having the following parameters: high feed pressure (10.7 atm. or greater); a low purge pressure (about 1.07 atm.); a moderate temperature (above 60° C.); and a rather long cycle time (10-12 minutes). The dimensionless flow (vol. per cycle/vol. of column) should be about 8.8 to 9.2 for the feed, and about 0.5 for the purge stream. A cycle with two-step product pressurization, as described by Cycle N4, should be used. The process will result in oxygen purity of more than 99.7%; recovery of about 25%; and productivity of about 11Nm$_3$/(m$^3$ hr). Separation results are sensitive to the feed pressure and mass transfer constant $\kappa$. Increasing the pressure and using smaller adsorbent particles could result in improved recovery and productivity, while maintaining desired purity.

The invention has been described with reference to the preferred embodiments. Obviously modifications and alterations will occur to others upon a reading and understanding of this specification. It is intended to include all such modifications and alterations insofar as they come within the scope of the appended claims or the equivalents thereof.

We claim:

1. A process for obtaining a high purity oxygen product from a gas comprising oxygen and argon in a ratio of about 21:1, comprising the steps of:

feeding a feed gas comprising oxygen and argon to a

TABLE 10

Comparison of the experimental results and theoretical predictions. Adsorber V = 0.801 l, adsorbent AgM (18), product tank V = 37.8 l.

| | | CONDITIONS | | | RESULTS | | | |
|---|---|---|---|---|---|---|---|---|
| EXPT. NO. | T° C. | Cycle Time (min) | Feed Flow (SLM) | Purge Flow (SLM) | Oxygen Purity % | Recovery % | Product Per Cycle | Product Per Hour |
| 5 | 60 | 10 | 0.95 | 0.3 | 99.5 | 6.6 | 0.31 | 1.86 |
| 6 | 60 | 10 | 1.018 | 0.3 | 99.45 | 6.4 | 0.28 | 1.68 |
| 7 | 60 | 10 | 1.018 | 0.3 | 99.2 | 8.9 | 0.47 | 2.82 |
| Theory | 60 | 10 | 0.87 | 0.07 | 99.67 | 13.6 | 0.49 | 2.94 |
| 8 | 90 | 10.5 | 0.78 | 0.17 | 99.4 | 9.5 | 0.35 | 2.01 |
| Theory | 90 | 12 | 0.7 | 0.08 | 99.43 | 8.9 | 0.22 | 1.1 |

As will be seen in the Table 10, at 60° C., the predicted purity, recovery, and productivity are better than achieved experimentally. As noted above, the product purity of Experiment 4 was 99.5 to 99.6 oxygen and, when corrected for losses due to sampling, the recovery was estimated to be at about 9.98% to 12.1%. These values are generally closer to the prediction at 60° C. than those for Experiments 5-7. The discrepancies are probably due to unaccounted for diffusion resistance that actually appears to be different for argon and oxygen. The model took them to be identical.

pressure swing adsorption column at a feed end thereof, the column including therein a bed of silver mordenite adsorbent selective to argon to produce a high purity oxygen feed product;

adsorbing argon on the silver mordenite;

subjecting the column to cocurrent blowdown to provide an enriched cocurrent blowdown oxygen product;

countercurrently blowing down the column to provide an enriched argon product;

purging the column with a purge stream comprised of feed product;

pressurizing the column with feed product and cocurrent blowdown oxygen product.

2. A process for obtaining a high purity oxygen product from a gas comprising oxygen and argon, as set forth in claim 1, wherein the step of feeding is conducted at a flow rate of about 8.8–9.2 vol. per cycle/vol. of column.

3. A process for obtaining a high purity oxygen product from a gas comprising oxygen and argon, as set forth in claim 1, wherein the step of feeding continues until the argon is about to break through a product end of said column.

4. A process for obtaining a high purity oxygen product from a gas comprising oxygen and argon, as set forth in claim 1, wherein the step of purging calls for a purge pressure of about 1.07 atm.

5. A process for obtaining a high purity oxygen product from a gas comprising oxygen and argon, as set forth in claim 1, wherein the flow rate of the purge stream is about 0.5 vol. per cycle/vol. of column.

6. A process for obtaining a high purity oxygen product from a gas comprising oxygen and argon, as set forth in claim 1, wherein the step of pressurizing comprises supplying the feed product and cocurrent blowdown oxygen product separately.

7. A process for obtaining a high purity oxygen product from a gas comprising oxygen and argon, as set forth in claim 1, wherein the step of pressurizing comprises supplying a mixture of the feed product and cocurrent blowdown oxygen product to the pressure swing adsorption column.

8. A process for obtaining a high purity oxygen product from a gas comprising oxygen and argon, as set forth in claim 1, wherein a cycle period of the process is in the range of about 10–12 minutes.

9. A process for obtaining a high purity oxygen product from a gas comprising oxygen and argon, as set forth in claim 1, wherein a level of recovery of oxygen according to the process is about 25%.

10. A process for obtaining a high purity oxygen product from a gas comprising oxygen and argon, as set forth in claim 1, wherein a level of productivity of the process is about 11 $Nm^3/M^3$ hr.

11. A process for splitting oxygen from a gas comprising oxygen and argon, as set forth in claim 1, wherein the adsorbent comprises at least about 5.5% by mass silver.

12. A process for splitting oxygen from a gas comprising oxygen and argon, as set forth in claim 11, wherein the adsorbent comprises at least about 12% by mass silver.

13. A process for obtaining a high purity oxygen product from a gas comprising oxygen and argon, as set forth in claim 1, wherein the feed gas has a pressure of at least about 10.7 atm.

14. A process for splitting oxygen from a gas comprising oxygen and argon, comprising the steps of:

feeding a feed gas comprising oxygen and argon to a pressure swing adsorption column at a feed end thereof at a pressure of at least 0.4 atm., the column including therein a bed of silver mordenite adsorbent selective to argon;

adsorbing argon onto the silver mordenite adsorbent;

recovering a product having an oxygen purity of at least about 99.7%.

15. A process for splitting oxygen from a gas comprising oxygen and argon, as set forth in claim 14, wherein a cycle time of said process is at least about 7 minutes.

16. A process for splitting oxygen from a gas comprising oxygen and argon, as set forth in claim 15, wherein said feed gas is supplied at a flow rate of about 8.8–9.2 vol. per cycle/vol. of column.

17. A process for splitting oxygen from a gas comprising oxygen and argon, as set forth in claim 14, wherein said column operates at a temperature of at least 60° C.

* * * * *